(12) United States Patent
Peng et al.

(10) Patent No.: US 8,094,401 B1
(45) Date of Patent: Jan. 10, 2012

(54) WRITING HIGH FREQUENCY PATTERN OVER A DC BACKGROUND TO DETECT SKIP TRACK ERASURE FOR A DISK DRIVE

(75) Inventors: Qingzhi Peng, San Jose, CA (US);
Kathy X. Tang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 854 days.

(21) Appl. No.: 12/049,557

(22) Filed: Mar. 17, 2008

(51) Int. Cl.
*G11B 5/03* (2006.01)

(52) U.S. Cl. ............... 360/66; 360/30; 360/31; 360/57; 360/62

(58) Field of Classification Search ............... None
See application file for complete search history.

(56) References Cited

U.S. PATENT DOCUMENTS

| | | | | |
|---|---|---|---|---|
| 4,513,333 | A * | 4/1985 | Young et al. | 360/77.02 |
| 5,053,893 | A * | 10/1991 | Hayata et al. | 360/66 |
| 5,416,165 | A * | 5/1995 | Okimura et al. | 525/209 |
| 6,166,536 | A * | 12/2000 | Chen et al. | 324/212 |
| 6,249,396 | B1 * | 6/2001 | Gray | 360/55 |
| 6,265,868 | B1 * | 7/2001 | Richter | 324/212 |
| 6,771,441 | B2 | 8/2004 | Tang et al. | |
| 6,785,085 | B2 * | 8/2004 | Guzik et al. | 360/77.08 |
| 6,791,775 | B2 * | 9/2004 | Li et al. | 360/31 |
| 6,906,880 | B1 | 6/2005 | Codilian | |
| 6,909,566 | B1 * | 6/2005 | Zaitsu et al. | 360/31 |
| 6,943,972 | B1 | 9/2005 | Chue et al. | |
| 6,972,920 | B2 | 12/2005 | Kim et al. | |
| 7,068,461 | B1 * | 6/2006 | Chue et al. | 360/75 |
| 7,095,576 | B2 | 8/2006 | Kim et al. | |
| 7,110,197 | B2 * | 9/2006 | Cho | 360/31 |
| 7,170,700 | B1 | 1/2007 | Lin et al. | |
| 7,245,447 | B2 * | 7/2007 | Zaitsu | 360/60 |
| 7,529,058 | B2 * | 5/2009 | Hara et al. | 360/77.06 |
| 2002/0075585 | A1 * | 6/2002 | Luong et al. | 360/31 |
| 2003/0081338 | A1 * | 5/2003 | Wang et al. | 360/66 |
| 2006/0066971 | A1 | 3/2006 | Alex et al. | |
| 2006/0092548 | A1 | 5/2006 | Mihara et al. | |
| 2006/0098318 | A1 | 5/2006 | Feng | |
| 2007/0040552 | A1 | 2/2007 | Ishimoto | |
| 2008/0112072 | A1 * | 5/2008 | Kasai et al. | 360/71 |

OTHER PUBLICATIONS

Wen Jiang et al., "Adjacent-Track Interference in Dual-Layer Perpendicular Recording", IEEE Transactions on Magnetics, pp. 1891-1896, vol. 39, No. 4, Jul. 2003.
A. S. Kao et al., "Wide-area track erasure in perpendicular recording", Journal of Magnetism and Magnetic Materials pp. 475-480, vol. 287, Feb. 2005.

\* cited by examiner

*Primary Examiner* — Dismery Mercedes

(57) ABSTRACT

A method of detecting skip track erasure for a head and disk of a disk drive is disclosed. N tracks are DC erased, and a periodic pattern is written to the disk at a target track within the DC erased tracks. The periodic pattern is substantially comprised of a high frequency component greater than 450 MHz. After writing the periodic pattern to the target track at least twice, at least two of the DC erased tracks other than the target track are read to generate respective read signals. The read signals are processed to detect a skip track erasure event.

18 Claims, 4 Drawing Sheets

WRITING HIGH FREQUENCY PATTERN OVER A DC BACKGROUND TO DETECT SKIP TRACK ERASURE FOR A DISK DRIVE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

When manufacturing a family of disk drives, the head/disk subsystem is typically tested to verify that a particular vendor's head will meet certain design criteria. For example, a vendor's head may be tested to measure a phenomena referred to as Wide-Area Track Erasure (WTE) due to inadequate shielding of the write element. The WTE effect is typically measured by DC erasing a large band of tracks (such as 8,000 tracks), writing a low frequency signal (25 MHz) to a target track within the band of tracks, and then measuring the signal noise in the adjacent tracks. However, there are phenomena other than WTE that need to be measured when evaluating the suitability of a particular vendor's head, or when selecting an operating write current for a particular vendor's head.

DETAILED DESCRIPTION OF EMBODIMENTS OF THE INVENTION

Figure 1A:
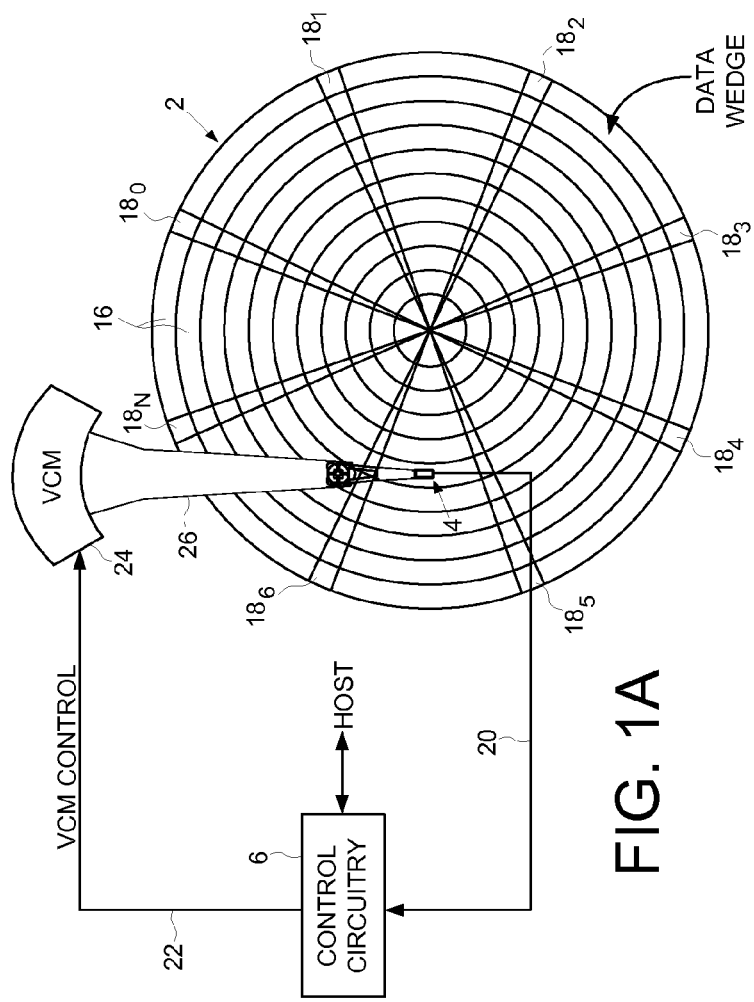
FIG. 1A shows a disk drive according to an embodiment of the present invention comprising a head actuated over the disk, and control circuitry.
Figure 1B:
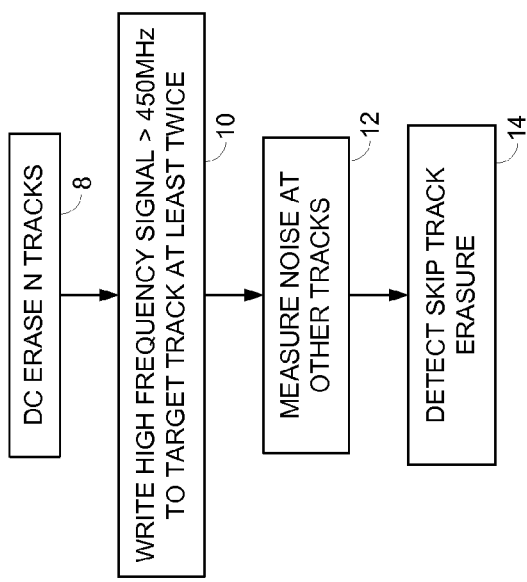
FIG. 1B is a flow diagram executed by the control circuitry for detecting a skip track erasure event according to an embodiment of the present invention.

FIG. 1A shows a disk drive according to an embodiment of the present invention comprising a disk 2, and a head 4 actuated over the disk 2. The disk drive further comprises control circuitry 6 for executing the flow diagram of FIG. 1B to detect a skip track erasure event for the head 4 and disk 2. N tracks are DC erased (step 8), and a periodic pattern is written to the disk at a target track within the DC erased tracks (step 10), wherein the periodic pattern is substantially comprised of a high frequency component greater than 450 MHz. After writing the periodic pattern to the target track at least twice, at least two of the DC erased tracks other than the target track are read to generate respective read signals (step 12). The read signals are processed to detect a skip track erasure event (step 14).

In the embodiment of FIG. 1A, the disk 2 comprises a plurality of data tracks 16 defined by a plurality of embedded servo sectors $18_0$-$18_N$. The control circuitry 6 processes the read signal 20 emanating from the head 4 to demodulate the servo sectors $18_0$-$18_N$ and generate a position error signal (PES) representing an error between the actual position of the head and a target position relative to a target data track. The control circuitry 6 filters the PES using a suitable compensation filter to generate a control signal 22 applied to a voice coil motor (VCM) 24 which rotates an actuator arm 26 about a pivot in order to actuate the head 4 radially over the disk in a direction that reduces the PES.

In one embodiment, the control circuitry 6 writes the periodic pattern to the data sectors of the target track (step 10), and then reads the data sectors. In an alternative embodiment, the control circuitry 6 writes the periodic pattern to the data wedges between consecutive servo sectors (e.g., between servo sectors $18_2$ and $18_3$). In one embodiment, the servo sectors $18_0$-$18_N$ are processed to locate the beginning and end of each data sector or data wedge within the target track.

Any suitable periodic pattern may be written to the target track, and in one embodiment, the periodic pattern comprises a square wave with a frequency greater than 450 MHz. Other suitable periodic patterns may be employed, such as a square wave having a variable duty cycle or a variable frequency.

Figure 2A:
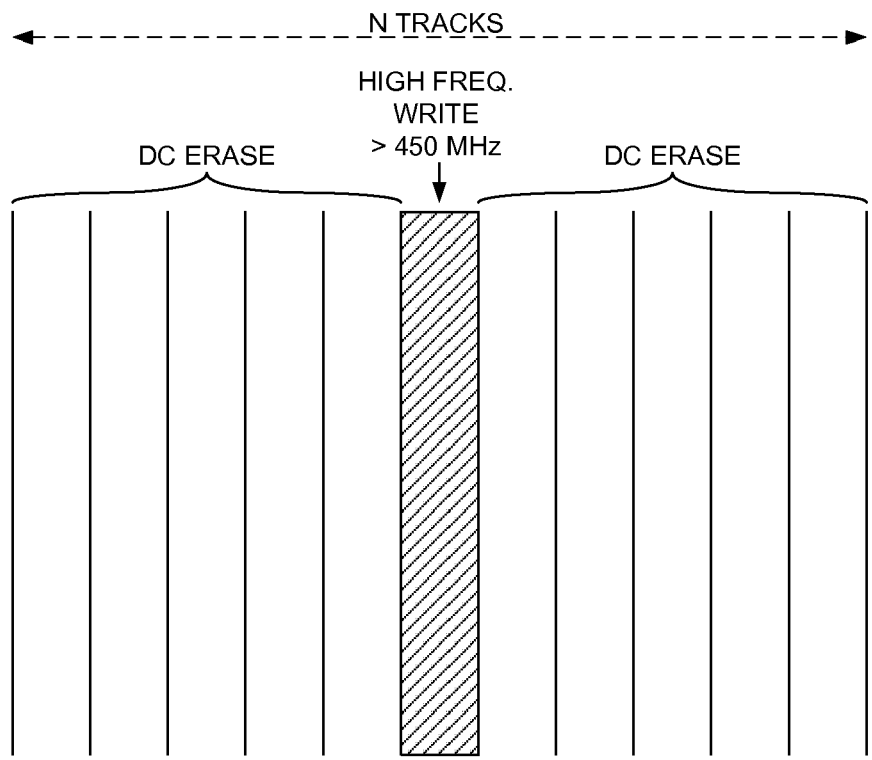
FIG. 2A shows an embodiment of the present invention wherein N tracks are DC erased and then a high frequency pattern written to a target track.

FIG. 2A illustrates an embodiment of the present invention wherein a suitable number of tracks (N>1) are DC erased, for example, by applying a DC current to the head 4 while performing a write operation to the tracks. However, the N tracks may be DC erased using any suitable technique, such as a magnetic printing technique wherein the entire surface of the disk is DC erased. Although eleven tracks are DC erased in the embodiment shown in FIG. 2A, any suitable number of tracks may be DC erased.

After DC erasing the N tracks, the periodic pattern is written to a target track within the N tracks, and in the embodiment of FIG. 2A, the periodic pattern is written to the middle track. The periodic pattern is written to the target track at least twice, and in one embodiment, the periodic pattern is written a suitable number of times to detect a skip track erasure event which may range from two to several thousand times. In one embodiment, the number of times the periodic pattern is written to the target track is determined by evaluating a number of heads and disks which are known to exhibit skip track erasure. Once an appropriate number for writing the periodic pattern is determined, a number of heads and disks are tested using the same number. In yet another embodiment, the threshold for detecting a skip track erasure event may be selected relative to the number of times the periodic pattern is written to the target track, wherein the threshold is typically increased as the number of writes increases.

Figure 2B:
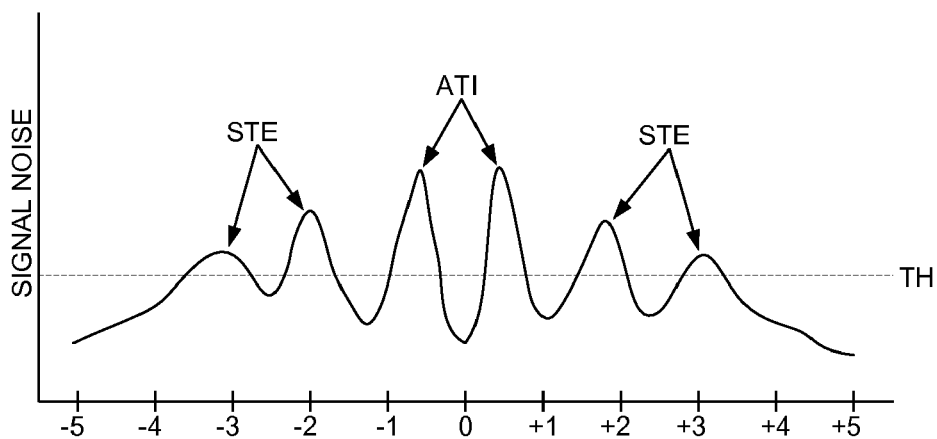
FIG. 2B shows an embodiment of the present invention wherein a skip track erasure event is detected if the read signal noise of the tracks proximate the target track exceeds a threshold.

FIG. 2B illustrates an example of read signal noise exceeding a threshold due to a skip track erasure event. The read signal noise due to adjacent track erasure is shown on each side of the target track, whereas the read signal noise due to a skip track erasure event occurs multiple tracks away from the target track (two and three tracks in the example of FIG. 2B). Accordingly, a skip track erasure event typically occurs multiple tracks away from the target track, but not as far as a Wide-Area Track Erasure which is typically detected by writing a low frequency pattern to the disk (25 MHz).

Figure 3:
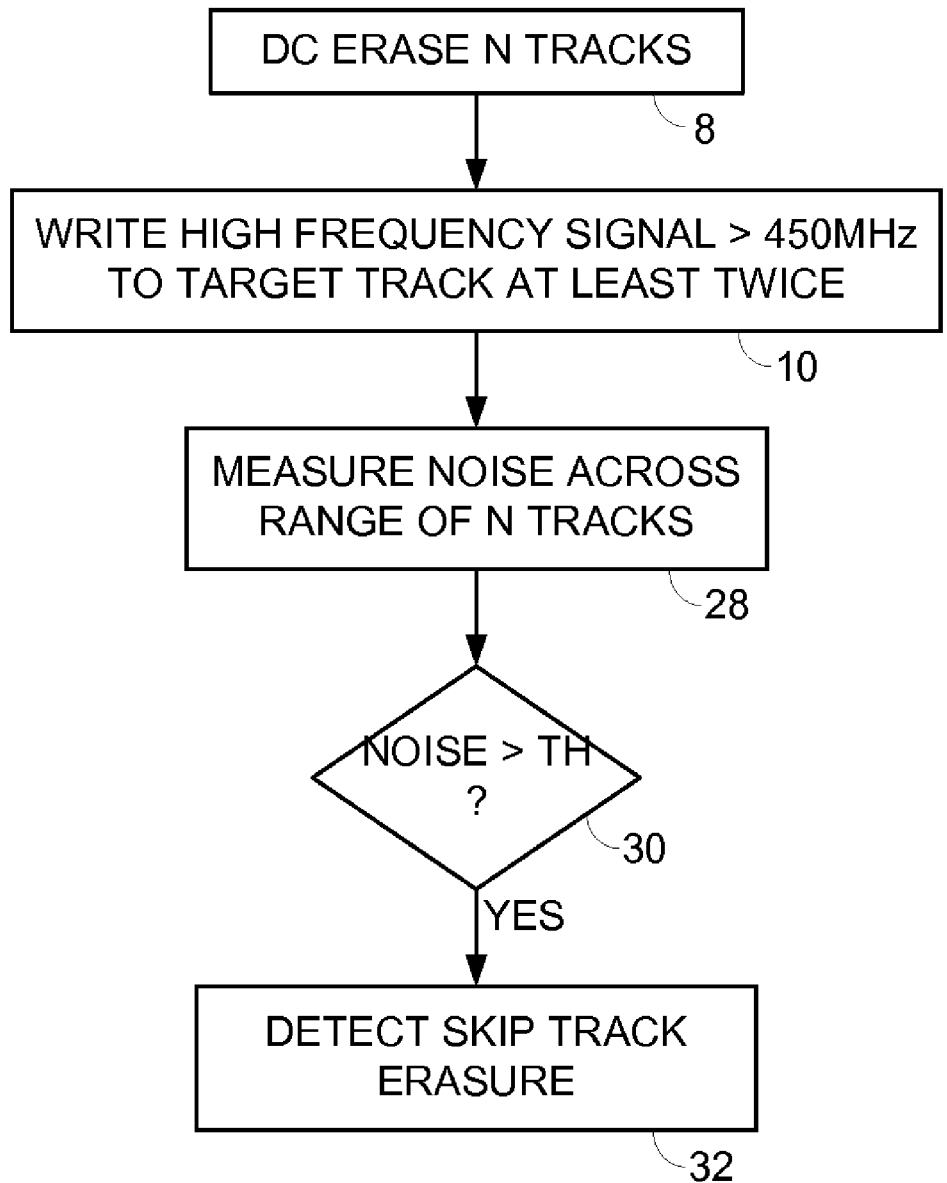
FIG. 3 is a flow diagram according to an embodiment of the present invention wherein a skip track erasure event is detected if the read signal noise over the range of N tracks exceeds a threshold.

FIG. 3 is a flow diagram according to an embodiment of the present invention wherein the read signal noise is measured across the entire range of N tracks (step 28). The read signal generated by reading each track is compared to a threshold (step 30), and a skip track erasure event is detected (step 32) if the read signal noise exceeds the threshold at any track other than the tracks immediate adjacent to the target track.

The read signal noise may be measured in any suitable manner. In one embodiment, a noise power in the read signal is measured by measuring a root mean square (RMS) value of the read signal. In another embodiment, the noise power in the read signal is measured by computing a discrete time Fourier transform of the read signal and evaluating the resulting frequency spectrum. In yet another embodiment, the noise power is measured by filtering the read signal with a suitable analog or discrete-time filter.

In the embodiment of FIG. 1A, each production disk drive may perform the flow diagrams described herein in order to evaluate the head and disk. For example, each production disk drive may attempt to detect when a particular head or disk exhibits skip track erasure so that the disk drive is either discarded or reworked. In yet another embodiment, each production disk drive may calibrate a write current setting (e.g., an amplitude or overshoot setting) in order to reduce the occurrence or magnitude of skip track erasure. In the embodiment where a disk drive detects skip track erasure, the tracks that are DC erased and the target track are defined by the servo sectors $18_0$-$18_N$ as shown in FIG. 1A.

Figure 4:
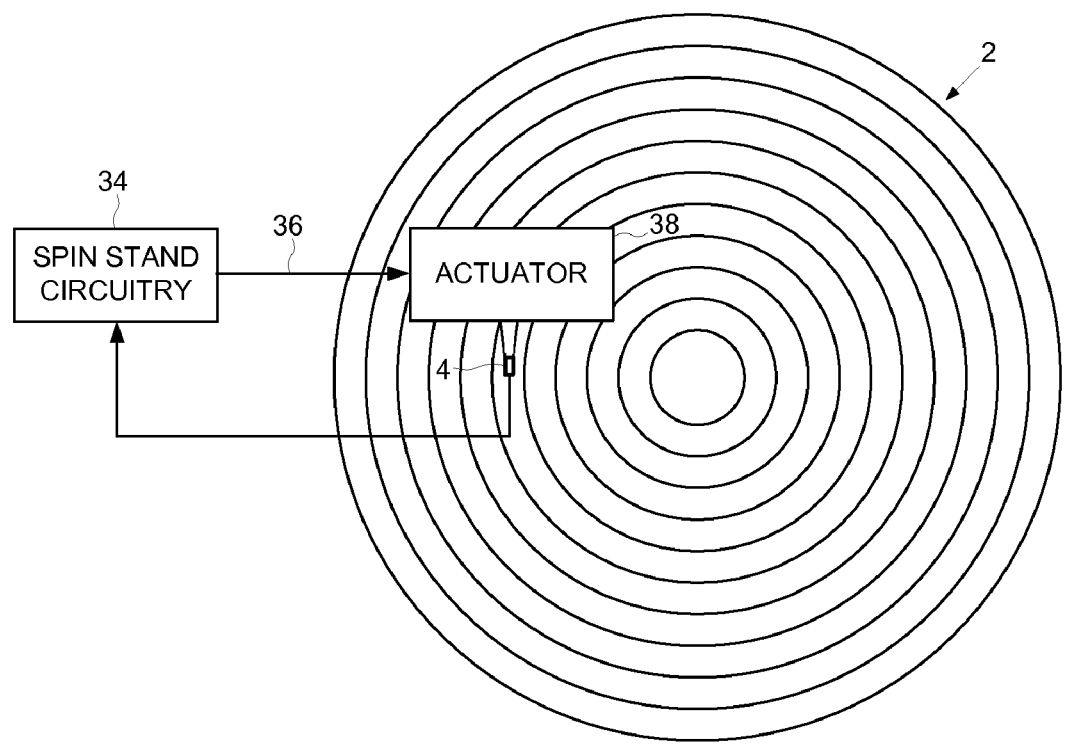
FIG. 4 shows an embodiment of the present invention wherein a spin stand implements the flow diagrams for detecting a skip track erasure event.

In an alternative embodiment shown in FIG. 4, the flow diagrams disclosed herein are implemented by a spin stand. In this embodiment, a number of heads and/or disks from a particular vendor may be tested with the spin stand to measure the susceptibility to skip track erasure. If a vendor's head or disk design fails the skip track erasure test, the vendor may be told to rework the part or a different vendor may be selected. The spin stand of FIG. 4 comprises suitable control circuitry 34 which generates control signals 36 applied to a suitable actuator 38, which may include a piezoelectric actuator. The head 4 to be tested is coupled to the actuator 38, for example, using a suspension which biases the head 4 toward the disk surface. The actuator 38 may also comprise a precise position sensor, such as a capacitance sensor, for detecting the radial location of the head 4 rather than detecting the radial location from embedded servo sectors $18_0$-$18_N$ that may eventually be written to the disk 2. Therefore, in this embodiment the "tracks" are defined relative to the resolution of the position sensor, and since the disk 2 need not comprise embedded servo sectors $18_0$-$18_N$, the periodic pattern may be written along the entire circumferential length of the track.

Any suitable control circuitry may be employed to implement the flow diagrams in the embodiments of the present invention, such as any suitable integrated circuit or circuits, which may include a microprocessor executing the steps of a control program. In the embodiment where the control circuitry is implemented within a disk drive, it may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry comprises suitable logic circuitry, such as state machine circuitry.

What is claimed is:

1. A method of detecting skip track erasure for a head and disk of a disk drive, the method comprising:
   DC erasing N tracks on the disk, where N is an integer greater than one;
   writing a periodic pattern to the disk at a target track within the N DC erased tracks, wherein the periodic pattern is substantially comprised of a high frequency component greater than 450 MHz;
   after writing the periodic pattern to the target track at least twice, reading at least two of the DC erased tracks other than the target track to generate respective read signals; and
   processing the read signals to detect a skip track erasure event.

2. The method as recited in claim 1, wherein the periodic pattern comprises a square wave.

3. The method as recited in claim 1, wherein processing the read signals to detect a skip track erasure event comprises measuring a noise power in the read signals.

4. The method as recited in claim 3, wherein measuring the noise power in the read signals comprises measuring an RMS value of the read signals.

5. The method as recited in claim 3, wherein measuring the noise power in the read signals comprises computing a discrete time transform of the read signals.

6. The method as recited in claim 3, wherein measuring the noise power in the read signals comprises filtering the read signals.

7. The method as recited in claim 3, wherein the skip track erasure event is detected if the measured noise exceeds a threshold.

8. The method as recited in claim 1, wherein the at least two DC erased tracks are on one side of the target track.

9. A disk drive comprising:
   a disk;
   a head actuated over the disk; and
   control circuitry operable to:
     DC erase N tracks on the disk, where N is an integer greater than one;
     write a periodic pattern to the disk at a target track within the N DC erased tracks, wherein the periodic pattern is substantially comprised of a high frequency component greater than 450 MHz;
     after writing the periodic pattern to the target track at least twice, read at least two of the DC erased tracks other than the target track to generate respective read signals; and
     process the read signals to detect a skip track erasure event.

10. The disk drive as recited in claim 9, wherein the periodic pattern comprises a square wave.

11. The disk drive as recited in claim 9, wherein processing the read signals to detect a skip track erasure event comprises measuring a noise power in the read signals.

12. The disk drive as recited in claim 11, wherein measuring the noise power in the read signals comprises measuring an RMS value of the read signals.

13. The disk drive as recited in claim 11, wherein measuring the noise power in the read signals comprises computing a discrete time transform of the read signals.

14. The disk drive as recited in claim 11, wherein measuring the noise power in the read signals comprises filtering the read signals.

15. The disk drive as recited in claim 11, wherein the skip track erasure event is detected if the measured noise exceeds a threshold.

16. The disk drive as recited in claim 9, wherein the at least two DC erased tracks are on one side of the target track.

17. The disk drive as recited in claim 9, further comprising a spin-stand actuator, wherein the spin-stand actuator positions the head over the disk.

18. The disk drive as recited in claim 9, further comprising a voice coil motor and an actuator arm, wherein the voice coil motor and actuator arm position the head over the disk.

* * * * *